US006631881B2

(12) United States Patent
Weldon et al.

(10) Patent No.: US 6,631,881 B2
(45) Date of Patent: Oct. 14, 2003

(54) SINGLE-STAGE FUEL TANK PRESSURE CONTROL VALVE

(75) Inventors: Craig Weldon, Chatham (CA); Alfred Schneider, Blenheim (CA)

(73) Assignee: Siemens Automotive Inc., Ontario (CA)

( * ) Notice: Subject to any disclaimer, the term of this patent is extended or adjusted under 35 U.S.C. 154(b) by 0 days.

(21) Appl. No.: 09/923,790

(22) Filed: Aug. 8, 2001

(65) Prior Publication Data

US 2002/0088957 A1 Jul. 11, 2002

Related U.S. Application Data

(60) Provisional application No. 60/237,879, filed on Oct. 4, 2000, and provisional application No. 60/223,760, filed on Aug. 8, 2000.

(51) Int. Cl.[7] ................................. F16K 31/02
(52) U.S. Cl. .......................... 251/129.02; 251/129.15; 123/516; 137/601.14
(58) Field of Search ....................... 257/129.02, 129.15; 123/516, 517, 518, 519, 520; 137/601.14, 522, 517, 630.19

(56) References Cited

U.S. PATENT DOCUMENTS

| | | | | | |
|---|---|---|---|---|---|
| 4,252,094 A | * | 2/1981 | Draxler | ................. | 251/129.14 |
| 4,483,369 A | | 11/1984 | Akagi et al. | ........... | 137/625.12 |
| 5,232,196 A | * | 8/1993 | Hutchings et al. | ..... | 251/129.15 |
| 5,237,980 A | * | 8/1993 | Gillier | ........................ | 123/520 |
| 5,280,775 A | * | 1/1994 | Tanamura et al. | .......... | 123/518 |
| 5,390,703 A | | 2/1995 | Tengesdal | ................... | 137/629 |
| 5,509,395 A | * | 4/1996 | Cook | .......................... | 123/518 |
| 5,533,707 A | * | 7/1996 | Beesley | ................. | 251/129.15 |
| 5,579,741 A | * | 12/1996 | Cook et al. | .................. | 123/516 |
| 5,629,660 A | | 5/1997 | Kenyon et al. | ............. | 335/227 |
| 5,630,403 A | * | 5/1997 | Van Kampen et al. | ...... | 123/520 |
| 5,803,056 A | * | 9/1998 | Cook et al. | .................. | 123/520 |
| 6,021,997 A | | 2/2000 | Hell | ......................... | 251/30.04 |
| 6,120,003 A | * | 9/2000 | Lubischer et al. | ...... | 251/129.02 |

OTHER PUBLICATIONS

U.S. patent application Ser. No. 09/960,732, Craig Weldon et al., filed Sep. 24, 2001.
U.S. patent application Ser. No. 09/960,718, Craig Weldon et al., filed Sep. 24, 2001.
U.S. patent application Ser. No. 09/931,373, Craig Weldon et al., filed Aug. 17, 2001.
U.S. patent application Ser. No. 09/923,796, Craig Weldon et al., filed Aug. 8, 2001.
U.S. patent application Ser. No. 09/923,792, Craig Weldon et al., filed Aug. 8, 2001.
U.S. patent application Ser. No. 09/923,789, Craig Weldon et al., filed Aug. 8, 2001.
U.S. patent application Ser. No. 09/923,78, Craig Weldon, filed Aug. 8, 2001.
U.S. patent application Ser. No. 09/863,756, Craig Weldon et al., filed May 24, 2001.
PCT International Search Report; PCT/CA01/00771; Dec. 17, 2001.

* cited by examiner

Primary Examiner—Gene Mancene
Assistant Examiner—John Bastianelli

(57) ABSTRACT

A valve structure that includes a housing, a valve element, and a seal. The housing includes a first communication path between a first port at a first pressure level and a second port at a second pressure level. The valve element is movable with respect to the housing between a first position, a second position, and an intermediate position between the first and second positions. The first position permits substantially unrestricted fluid flow between the first and second ports. The second position substantially prevents fluid flow between the first and second ports. The seal is located at an interface between the housing and the valve element. The seal deforms in response to a differential between the first and second pressure levels such that at the intermediate position, there is restricted fluid flow between the first and second ports.

19 Claims, 1 Drawing Sheet

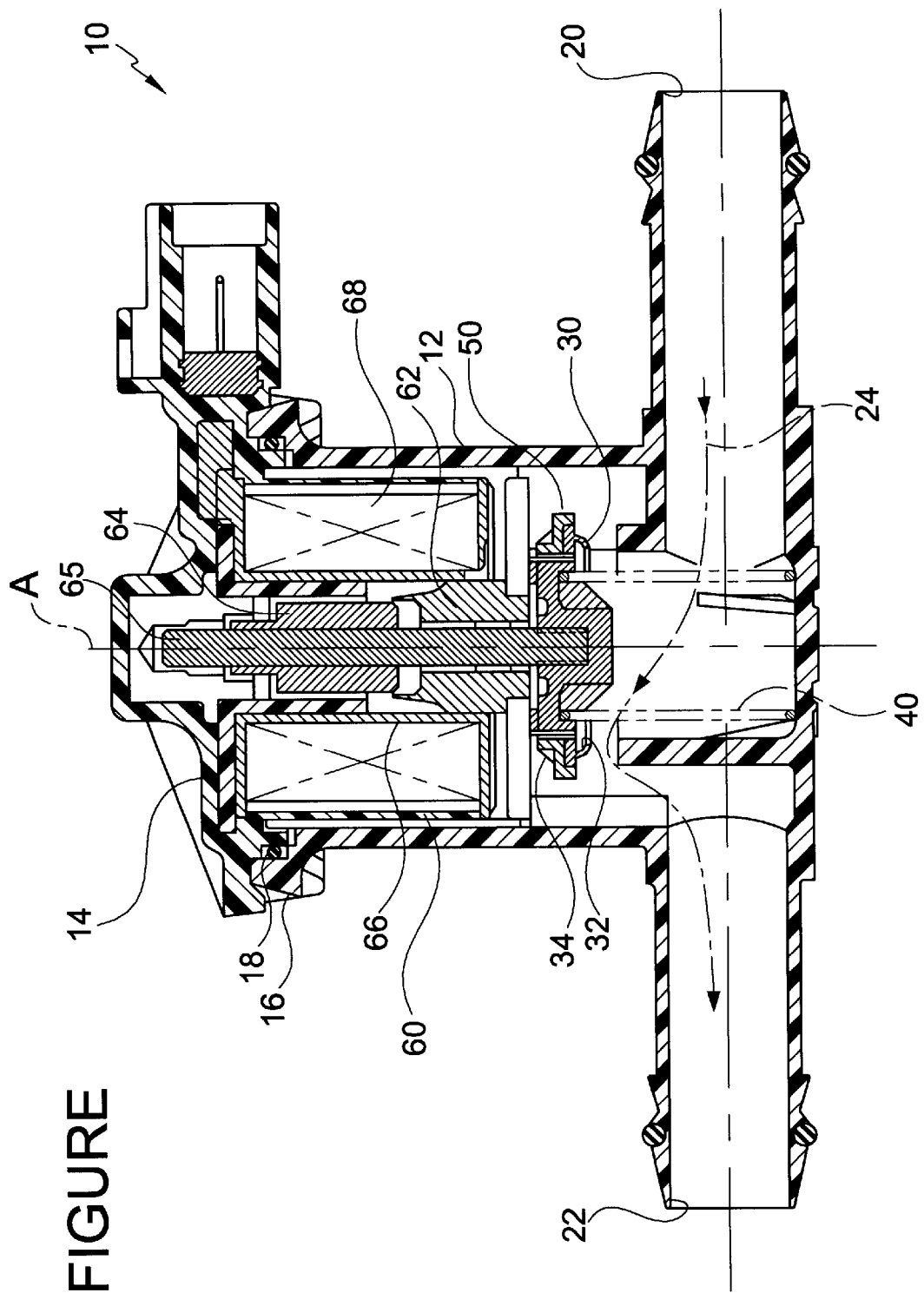

SINGLE-STAGE FUEL TANK PRESSURE CONTROL VALVE

CLAIM FOR PRIORITY

This application claims the benefit of the earlier filing dates of U.S. Provisional Applications No. 60/223,760 (filed Aug. 8, 2000) and No. 60/237,879 (filed Oct. 4, 2000), which are hereby incorporated by reference in their entirety.

FIELD OF THE INVENTION

This disclosure generally relates to a pressure control valve. In particular, this disclosure is directed to an electrically operated, single-stage valve to control the level of vapor pressure in a fuel tank of a vehicle.

BACKGROUND OF THE INVENTION

It is believed that prior to legislation requiring vehicles to store hydrocarbon vapors that are generated when refueling a vehicle, a simple orifice structure was used to maintain a positive pressure in a fuel tank to retard vapor generation. It is believed that such orifice structures could no longer be used with the advent of requirements controlling onboard refueling. It is believed that, on some vehicles, the orifice structure was simply deleted, and on other vehicles, the orifice structure was replaced with a diaphragm-actuated pressure relief valve. It is believed that these diaphragm-actuated valves suffer from a number of disadvantages including that the calibration (i.e., pressure blow-off level) changes with temperature and age.

It is believed that it is necessary on some vehicles to maintain an elevated pressure in the fuel tank to suppress the rate of fuel vapor generation and to minimize hydrocarbon emissions to the atmosphere. It is believed that under hot ambient temperature conditions or when the fuel is agitated, e.g., when a vehicle is operated on a bumpy road, the amount of fuel vapor generated can exceed the amount of fuel vapor that can be purged by the engine. It is believed that a carbon canister can become hydrocarbon saturated if these conditions occur and are maintained for an extended period. It is believed that such a hydrocarbon saturated carbon canister is unable to absorb the additional fuel vapors that occur during vehicle refueling, and that hydrocarbon vapors are released into the atmosphere. A legislated standard has been set for the permissible level of free hydrocarbons that may be released. A so-called "shed test" is used to measure the emission of the free hydrocarbons for determining compliance with the legislated standard.

It is believed that there is needed to provide a valve that overcomes the drawbacks of orifice structures and diaphragm-actuated pressure relief valves.

SUMMARY OF THE INVENTION

The present invention provides a valve structure that comprises a housing, a valve element, and a seal. The housing includes a first communication path between a first port at a first pressure level and a second port at a second pressure level. The valve element is movable with respect to the housing between a first position, a second position, and an intermediate position between the first and second positions. The first position permits substantially unrestricted fluid flow between the first and second ports. The second position substantially prevents fluid flow between the first and second ports. The seal is located at an interface between the housing and the valve element. The seal deforms in response to a differential between the first and second pressure levels such that, at the intermediate position, there is restricted fluid flow between the first and second ports.

The present invention also provides a valve structure for controlling fuel vapor flow between an evaporative emission space of a fuel tank and a fuel vapor collection canister that comprises a housing, a valve element, and a seal. The housing includes a first port, a second port, and a fuel vapor flow path extending between the first and second ports. The first port is adapted for receiving fuel vapor flow from the evaporative emission space and is at a first pressure level. The second port is adapted for supplying fuel vapor flow to the fuel vapor collection canister and is at a second pressure level. The valve element is movable with respect to the housing between a first position, a second position, and an intermediate position between the first and second positions. The first position permits substantially unrestricted fuel vapor flow from the first port to the second port. The second position substantially prevents fuel vapor flow from the first port to the second port. The seal is located at an interface between the housing and the valve element. The housing includes a hollow frustum having an inner surface and an outer surface. The inner surface is in fuel vapor communication with the first port at the intermediate position of the valve element. The outer surface is in fuel vapor communication with the second port at the intermediate position of the valve element.

BRIEF DESCRIPTIONS OF THE DRAWINGS

The accompanying drawing, which is incorporated herein and constitutes part of this specification, illustrates an embodiment of the invention, and, together with the general description given above and the detailed description given below, serves to explain the features of the invention.

The Figure is a sectional view of a single-stage fuel tank pressure control valve in a first position wherein fluid flow is permitted through a fluid communication path.

DETAILED DESCRIPTION OF THE PREFERRED EMBODIMENT

A fuel tank pressure control valve 10 can be located along a vapor line (not shown) connecting a fuel vapor dome, i.e., the gaseous portion within a fuel tank (not shown), and a charcoal canister (not shown). A canister purge control valve (not shown) can be used to purge hydrocarbons that have been collected in the charcoal canister (not shown). Typically, the hydrocarbons that are purged from the charcoal canister are combusted by an internal combustion engine (not shown).

A vapor dome pressure level that is approximately 10" water above atmospheric pressure has been determined to suppress fuel vapor generation in the fuel tank (not shown). A fuel tank pressure sensor (not shown) can be used to detect pressures in excess of this determined level. When excess pressure is detected, the fuel tank pressure control valve 10 is supplied an electrical signal which results in the fuel tank pressure control valve 10 opening to decrease pressure to or slightly below the determined level.

The fuel tank pressure control valve 10 includes a housing, a valve assembly 50, and a seal 30. The housing can include a body 12 and a cover 14. The body 12 and the cover 14 can be made of any material that is suitable for contacting and containing fuel and/or fuel vapor and for housing an actuator 60. The body 12 and the cover 14 can be made of different materials or the same material, as long as the material is suitable for its intended purpose. The body 12 and the cover 14 can be a homogenous whole or separate components coupled together, for example, by an interlocking flange assembly. Preferably, the body 12 and the cover 14 are separate components coupled together by an interlocking flange assembly 16. Alternative coupling techniques can be substituted for the interlocking flange assembly 16. A rubber O-ring 18 can provide a fluid-tight seal, which is impermeable to hydrocarbon migration, between the body 12 and the cover 14. Alternative sealing means, e.g., a gasket, can be substituted for the O-ring 18. The housing can be two separate halves of the body 12 and the cover 14 divided along an axis A. Preferably, the housing is as described above.

The body 12 includes an inlet port 20 for ingress of fuel vapor from an evaporative emission space of the fuel tank (not shown) and an outlet port 22 for egress of fuel vapor to the carbon canister (not shown). Fluid communication between the inlet port 20 at an inlet pressure level and the outlet port 22 at an outlet pressure level can be through a fluid communication path 24. The inlet pressure level is greater than ambient pressure, while the outlet pressure level is less than ambient pressure. Fluid flow through the fluid communication path 24 is controlled by the valve assembly 50. As used herein, the term "fluid" can refer to a gaseous phase, a liquid phase, or a mixture of the gaseous and liquid phases. The term "fluid" preferably refers to the gaseous phase, i.e., fuel vapor.

The valve assembly 50 is movable along the axis A with respect to the housing between an open position, a closed position, and an intermediate position. The intermediate position is between the open and closed positions. As shown in the Figure, the open position permits substantially unrestricted fluid flow between the inlet and outlet ports 20, 22. The closed position (not shown) substantially isolates fluid flow between the inlet and outlet ports 20, 22.

The seal 30 is located at an interface between the housing and the valve assembly 50. The seal includes an annular extension that projects obliquely with respect to the axis A in the open position. The annular extension may be a hollow frustum. The annular extension can include a transverse dimension that is generally constant with respect to the projection of the annular extension. The annular extension can also include a transverse dimension that can taper with respect to the projection of the annular extension. The hollow frustum includes an inner surface 32 and an outer surface 34. The inner surface 32 of the hollow frustum generally confronts the axis A, and the outer surface 34 of the hollow frustum generally faces opposite the inner surface 32. The inner surface 32 is in fluid communication with the inlet port 20 at the intermediate position of the valve assembly 50. The outer surface 34 is in fluid communication with the outlet port 22 at the intermediate position of the valve assembly 50. When the inlet pressure is greater than the outlet pressure and the seal 30 contacts or is in close proximity to the interface, the seal 30 can be self-energizing between the intermediate and closed positions. The seal 30 deforms in response to a differential between the first and second pressure levels, such that at the intermediate position, there is a restricted, i.e., reduced, flow between the first and second ports 20, 22. The deforming of the seal 30 at the intermediate position can include fluttering in response to the differential between the inlet and outlet pressure levels. The seal member 30 engages the housing in the closed and intermediate positions.

A resilient element 40, e.g., a coil spring, that can be centered around the axis A, extends between the valve assembly 50 and an internal wall of the body 12. The resilient element 40 biases the valve assembly 30 toward the open position in opposition to the actuating force of the actuator 60.

The actuator 60 is disposed within the body 12 and displaces the valve assembly 50 from the open position to the closed position. The actuator 60 includes a stator 62, an armature 64, a bobbin 66, and a winding 68. For example, the actuator 60 can be electromagnetic, piezoelectric, or any other type of actuator. Preferably, the actuator 60 is an electromagnetic solenoid. The armature 64 is operatively connected to the valve assembly 50 and provides a first magnetic pole. The stator 62 provides a second magnetic pole to which the first magnetic pole can be attracted. The bobbin 66 surrounds the stator 62 and provides a wire form. The winding 68 includes a plurality of wire loops on the wire form. The stator 62 is fixed with respect to the body 12, and the armature 64 is displaceable along the axis A with respect to the stator 62. The stator 62 supports a bearing that guides a shaft 65 which connects the armature 64 and the proximate valve assembly 50.

There are a plurality of positions of the valve assembly 50 with respect to the housing. The open position, as shown in the Figure, permits substantially unrestricted fluid flow from the inlet port 20 at the inlet pressure to the outlet port 22 at the outlet pressure. In the open position, the valve assembly 50 is spaced from the body 12 such that fluid communication is permitted through the fluid communication path 24 through a gap between the valve assembly 50 and the body 12.

The closed position (not shown) substantially isolates fluid flow from the inlet port 20 to the outlet port 22. In the closed position (not shown), the seal 30 engages an internal surface of the body 12 such that the gap of the fluid communication path 24 is closed. To achieve this position, the valve assembly 50 is displaced by the actuator 60 along the axis A toward the internal surface of the body 12.

In the closed position, if fuel tank pressure becomes too large, e.g., through burst pressure, agitation, hot ambient conditions, etc., the valve assembly 50 permits flow of fuel vapor from the inlet port 20 to the outlet port 22. The release of pressure provides a blow-off feature. This is achieved because the pressure acting on the valve assembly 50 is greater than the force of the actuator 60 and the resilient element 40. When this occurs, the valve assembly 50 is spaced from the body 12. Thus, fluid communication is permitted through the gap.

The intermediate position (not shown) provides restricted fluid flow from the inlet port 20 at the inlet pressure to the outlet port 22 at the outlet pressure. In the intermediate position, the valve assembly 50 is positioned away from the internal surface of the body 12 such that fluid communication between the inlet and outlet ports 20, 22 is restricted. The intermediate position occurs at an intermediate position between the open and closed positions.

The actuator 60, e.g., an electromagnetic solenoid, operates through a power device, which can be a constant current driver or a pulse-width-modulated signal, such that there is an approximately fifty percent power level when the valve 10 is in the intermediate position. Thus, when the actuator 60 is not energized, the fluid communication path 24 allows fluid flow therethrough. This also provides a fail-safe condition such that fuel vapor build-up is prevented in the fuel tank. At an approximately zero percent power level, the valve 10 is in the open position, and at an approximately one hundred percent power level, the valve 10 is in the closed position.

This fuel tank pressure control valve 10 provides low flow restriction during fuel tank re-fueling (i.e., in the open position), fails to an open state (i.e., the open position), and provides restricted flow during routine vehicle operation to ensure that a sufficient vapor pressure is maintained to suppress additional fuel vapor generation (i.e., the intermediate position). During carbon canister purging (i.e., the closed position) excess hydrocarbons stored in the canister are purged to an internal combustion engine. Thus, fuel tank pressure control valve 10 isolates the fuel tank, thereby preventing purging directly from the evaporative emission space of the fuel tank. Isolating the fuel tank, therefore, prevents or reduces the amount of hydrocarbons in tail pipe emissions.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A valve structure comprising:
    a housing including a fluid communication path between a first port at a first pressure level and a second port at a second pressure level;
    a valve element movable with respect to the housing between a first position, a second position, and an intermediate position between the first and second positions, the first position permitting substantially unrestricted fluid flow between the first and second ports, and the second position substantially preventing fluid flow between the first and second ports; and
    a seal being located at an interface between the housing and the valve element, the seal deforming in response to a differential between the first and second pressure levels such that at the intermediate position there is restricted fluid flow between the first and second ports.

2. The valve structure according to claim 1, wherein the valve element is movable along an axis, and the seal comprises an annular lip projecting obliquely with respect to the axis at the first position of the valve element.

3. The valve structure according to claim 2, wherein the annular lip comprises a hollow frustum including an inner surface and an outer surface, the inner surface generally confronts the axis and the outer surface generally faces opposite the inner surface.

4. The valve structure according to claim 3, wherein the inner surface is in fluid communication with the first port at the intermediate position of the valve element, and the outer surface is in fluid communication with the second port at the intermediate position of the valve element.

5. The valve structure according to claim 4, wherein the first pressure is greater than the second pressure such that the seal is self-energizing between the intermediate and second positions.

6. A valve structure comprising:
    a housing including a fluid communication path between a first port at a first pressure level and a second port at a second pressure level;
    a valve element movable with respect to the housing along an axis between a first position, a second position, and an intermediate position between the first and second positions, the first position permitting substantially unrestricted fluid flow between the first and second ports, and the second position substantially preventing fluid flow between the first and second ports; and
    a seal being located at an interface between the housing and the valve element, the seal including an annular lip projecting obliquely with respect to the axis at the first position of the valve element, the seal deforming in response to a differential between the first and second pressure levels such that at the intermediate position there is restricted fluid flow between the first and second ports, and the seal deforming includes the annular lip fluttering in response to the differential between the first and second pressure levels.

7. The valve structure according to claim 1, further comprising:
    a resilient element biasing the valve element toward the first position.

8. The valve structure according to claim 7, wherein the resilient element comprises a coil spring.

9. The valve structure according to claim 7, further comprising:
    an actuator displacing the valve element against the bias of the resilient element.

10. The valve structure according to claim 9, wherein the actuator comprises an electromagnetic solenoid.

11. A valve structure comprising:
    a housing including a fluid communication path between a first port at a first pressure level and a second port at a second pressure level;
    a valve element movable with respect to the housing between a first position, a second position, and an intermediate position between the first and second positions, the first position permitting substantially unrestricted fluid flow between the first and second ports, and the second position substantially preventing fluid flow between the first and second ports;
    a seal being located at an interface between the housing and the valve element, the seal deforming in response to a differential between the first and second pressure levels such that at the intermediate position there is restricted fluid flow between the first and second ports;
    a resilient element biasing the valve element toward the first position; and
    an electromagnetic solenoid displacing the valve element against the bias of the resilient element the electromagnetic solenoid operating via a power device such that there is an approximately zero percent power level when the valve element is in the first position, there is an approximately fifty percent power level when the valve element is in the intermediate position, and there is an approximately one-hundred percent power level when the valve element is in the second position.

12. A valve structure for controlling fuel vapor flow between an evaporative emission space of a fuel tank and a fuel vapor collection canister, the valve structure comprising:
    a housing including a first port, a second port, and a fuel vapor flow path extending between the first and second ports, the first port being adapted for receiving fuel vapor flow from the evaporative emission space and being at a first pressure level, and the second port being adapted for supplying fuel vapor flow to the fuel vapor collection canister and being at a second pressure level; and
    a valve element movable with respect to the housing between a first position, a second position, and an intermediate position between the first and second positions, the first position permitting substantially unrestricted fuel vapor flow from the first port to the second port, and the second position substantially preventing fuel vapor flow from the first port to the second port; and a seal being located at an interface between the housing and the valve element, the seal including a hollow frustum having an inner surface and an outer surface, the inner surface being in fuel vapor communication with the first port at the intermediate position of the valve element, and the outer surface being in fuel vapor communication with the second port at the intermediate position of the valve element.

13. A valve structure for controlling fuel vapor flow between an evaporative emission space of a fuel tank and a fuel vapor collection canister, the valve structure comprising:

a housing including a first port, a second port, and a fuel vapor flow path extending between the first and second ports, the first port being adapted for receiving fuel vapor flow from the evaporative emission space and being at a first pressure level, and the second port being adapted for supplying fuel vapor flow to the fuel vapor collection canister and being at a second pressure level; and a valve element movable with respect to the housing between a first position, a second position, and an intermediate position between the first and second positions, the first position permitting substantially unrestricted fuel vapor flow from the first port to the second port, and the second position substantially preventing fuel vapor flow from the first port to the second port; and a seal being located at an interface between the housing and the valve element, the seal including a hollow frustum having an inner surface and an outer surface, the inner surface being in fuel vapor communication with the first port at the intermediate position of the valve element, and the outer surface being in fuel vapor communication with the second port at the intermediate position of the valve element, the seal deforming in response to a differential between the first and second pressure levels such that at the intermediate position there is restricted fuel vapor flow from the first port to the second port.

14. The valve structure according to claim 13, wherein the seal deforming comprises the hollow frustum fluttering in response to the differential between the first and second pressure levels.

15. The valve structure according to claim 12, further comprising:

a resilient element biasing the valve element toward the first position.

16. The valve structure according to claim 15, further comprising:

an actuator displacing the valve element against the bias of the resilient element.

17. The valve structure according to claim 12, wherein the valve element moves along an axis, and an axial cross-section of the hollow frustum comprises a lip projecting obliquely with respect to the axis at the first position of the valve element.

18. The valve structure according to claim 17, wherein the lip comprises a transverse dimension that is generally constant with respect to the projection of the lip.

19. The valve structure according to claim 17, wherein the lip comprises a transverse dimension that tapers with respect to the projection of the lip.

* * * * *